(No Model.)

J. A. McCREARY.
Process of and Apparatus for Distilling Turpentine.

No. 242,015. Patented May 24, 1881.

Witnesses,
W. A. Bertram
O. L. H. Barclay.

Inventor,
James A. McCreary.
by
R. D. Williams
Attorney.

UNITED STATES PATENT OFFICE.

JAMES A. McCREARY, OF BALTIMORE, MARYLAND.

PROCESS OF AND APPARATUS FOR DISTILLING TURPENTINE.

SPECIFICATION forming part of Letters Patent No. 242,015, dated May 24, 1881.

Application filed April 14, 1880. (No model.)

*To all whom it may concern:*

Be it known that I, JAMES A. McCREARY, of Baltimore city, State of Maryland, have invented certain new and useful Improvements in Processes of and Apparatus for Distilling Turpentine; and I hereby declare the same to be fully, clearly, and exactly described as follows, reference being had to the accompanying drawings, in which—

Figure 1:
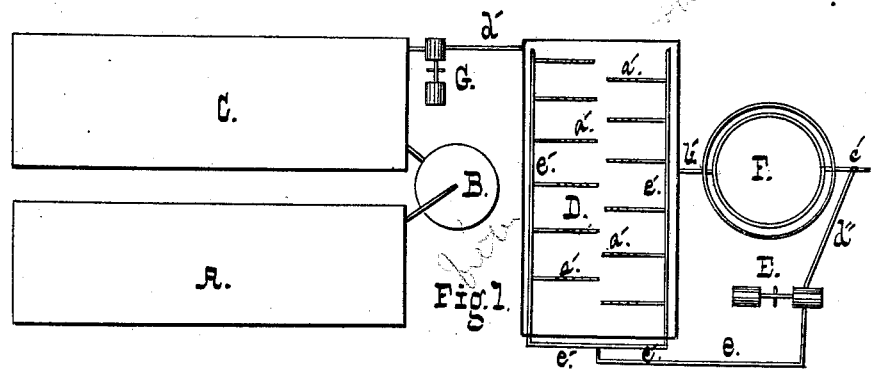
Figure 2:
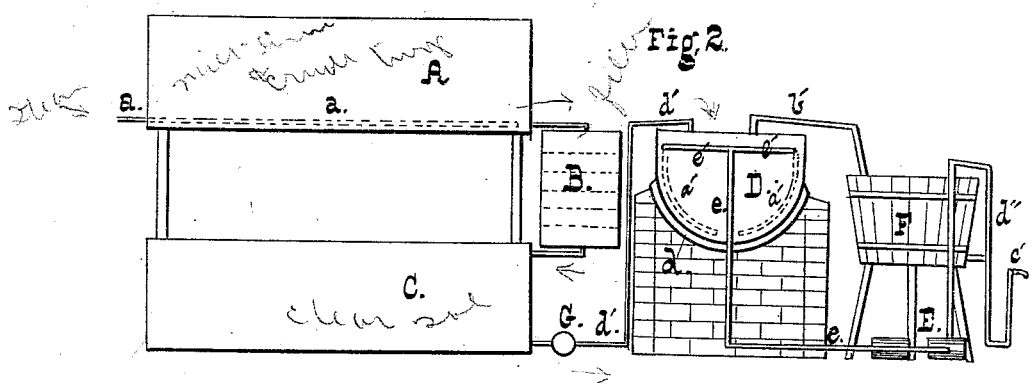

Figure 1 is a plan of the plant, the top of the still being removed. Fig. 2 is an elevation of the same.

This invention has for its object to produce a light high-grade rosin from crude turpentine, "virgin drip," &c., and incidentally to facilitate the process of distilling the spirits of turpentine. To this end I carry out the process *ab initio* in such manner that the product is at no stage subjected to a temperature greatly, if at all, exceeding 165° Fahrenheit.

The dark color of ordinary commercial rosin is due mainly to two causes—viz., the high degree of temperature to which by the processes heretofore in use it was necessarily subjected, and to the discoloration by the presence of foreign matters, which contaminate the crude turpentine and enter with it into the still. These impurities consist mainly of dirt, splinters of pine-bark, and the needles and cones, which in carrying out my process are removed prior to the inception of the distillation.

In practice I proceed as follows: The crude turpentine being placed in a suitable vat or tank, by preference supplied with a steam jacket or coil, or equivalent means for heating it, a sufficient quantity of spirits of turpentine or other menstruum is added thereto to make the mass, when thoroughly mixed and slightly warmed, thin enough to pass through proper filters or strainers, whereby the foreign matters are removed and a limpid solution of rosin in spirits of turpentine is produced. This is then pumped into the still, the spirits are distilled off, and the residuum, consisting of clear amber-colored rosin, is drawn off and allowed to solidify.

The mode of distilling will be understood in connection with the description of the apparatus.

In the drawings, A is the tank in which the menstruum is added to the crude turpentine. B is the filter or strainer, and C a vat into which the clear solution flows from the filters.

The tank A is provided with a steam-pipe, $a$, as shown.

D is the still, having a suitable steam-jacket, $d$, and an inlet-pipe, $d'$, through which the solution is forced from the tank C by means of a pump, G. The neck $b'$ of the still leads to a suitable worm in a vat, F. The outlet-pipe $c$ of the worm connects with a pipe, $d''$, the lower end of which forms a U, as shown, and is provided with a cock, $c'$. The pipe $d''$ leads to a pump, E, from which a pipe, $e$, leads to the still, where it branches into two pipes, $e'$, extending along the sides of the still. Within the latter a number of laterally-perforated pipes, $a'$ $a'$, extend from the pipes $e'$ nearly to the bottom of the still, as shown in Fig. 2.

In operation, the still being charged with the solution from the tank C, heat is applied by means of steam led under the false bottom of the still, and the pump E is set in motion. The volatilized spirits of turpentine condensing in the worm is drawn off as required, the column in the U-tube preventing entrance of air as the cock is opened. The inner branch of this tube is made sufficiently longer than the outer to give ample head to insure flow from the spout when the cock is opened; or, as an alternative, a second cock may be used in the pipe $d''$. The air and uncondensed vapors are forced back to the still through the pipes $e$ $e'$ $a'$, and bubble up through the contents of the still, keeping them in constant agitation.

It is evident that as the distillation progresses the approximation to a vacuum increases by reason of the space left empty in the still, whereby the volatilizing effect of a given temperature is increased in proper ratio to the volatility of the contents of the still. The whole operation is thus rendered certain and uniform, and most satisfactory and gratifying results are reached both in point of quantity and quality of product.

When the distillation is complete the rosin is simply drawn off from the still and allowed to solidify. This product, by the described process, is in marked contrast to the dark reddish-brown crude rosin which is the product of the common process, and this for the reason that it has never been excessively heated, and never heated at all in presence of its original impurities, except the slight warming in the initial step to facilitate solution. While still in the tank A the acidity of the crude dissolved turpentine may be corrected by the addition of alkali, (by preference milk of lime being used,) the excess of which may be precipitated by carbonic-acid gas.

As conducive to the volatilization of the contents of the still, the incoming blast of air and vapor may be heated, but not to such a point as to discolor the product, the temperature throughout the process being limited to, say, 165° Fahrenheit.

Now, I am fully aware that it is not new to conduct steam under the surface of the contents of turpentine-stills, and that air has heretofore been blown over the surface of the same; but I am not aware and do not believe that prior to my invention a circulating blast of air had been driven down through the liquid contents of the still, and after condensation of volatile matters returned to the still, as set forth.

What I claim is—

1. In a process of distilling turpentine, the method hereinbefore set forth of forcing the air and uncondensed products of distillation from the worm to the still and conducting them under the surface of the liquid contents of the latter, substantially as described.

2. The process herein described of preparing crude turpentine for distillation, consisting in adding thereto a suitable menstruum and an alkali, precipitating excess of the latter, and filtering, as set forth.

3. The process hereinbefore described of preparing refined products from crude turpentine, consisting in diluting the crude materials with a suitable menstruum and filtering it, then distilling, and, pending the progress of distillation, conducting the uncondensed products from the worm to the still and forcing them through the liquid contents of the latter, as set forth.

4. The combination, substantially as hereinbefore set forth, of the still having laterally-perforated air-pipes, the worm or condenser, and an air-forcing device intermediate the worm and still and in connection with both, substantially as described.

5. The combination, substantially as set forth, of the still having air-pipes leading to, or nearly to, its bottom, the worm-tube provided with a U-pipe, and the air-forcing pump intermediate the worm and still and in connection with both, as described.

JAMES A. McCREARY.

Witnesses:
R. D. WILLIAMS,
JOHN C. GITTINGER.